Figure 1:
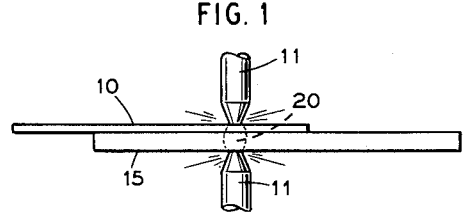

April 30, 1957    J. W. WELSH    2,790,891
WELDED JOINTS AND METHOD OF MAKING THE SAME
Filed June 9, 1955

*INVENTOR.*
JAMES W. WELSH
BY
ATTORNEY

United States Patent Office 2,790,891
Patented Apr. 30, 1957

2,790,891
WELDED JOINTS AND METHOD OF MAKING THE SAME

James William Welsh, Summit, N. J., assignor to Signal-Stat Corporation, Brooklyn, N. Y., a corporation of New York Application June 9, 1955, Serial No. 514,329

6 Claims. (Cl. 219—91)

This invention relates to welded joints and methods of making the same, and, more particularly, to an improved and effective welded joint between high carbon spring steel and cold rolled or mild steel.

In the welding of high carbon spring steel to cold rolled or mild steel by a spot welding technique, for example, the welding-heat-affected parts are air hardened to a high degree, thus making the weld and adjacent areas of the metal brittle. Consequently, spot welding cannot be used, as a production process, in joining a high carbon spring steel member, such as a "flasher" vane, to a supporting bracket of cold rolled steel. Such a high carbon spring steel vane and its supporting bracket of cold rolled steel are used, for example, in the "flasher" construction forming the subject matter of my copending application Ser. No. 374,976, filed August 18, 1953.

In an attempt to produce a satisfactory joining of such a high carbon spring steel vane to a cold rolled steel support bracket, riveting was attempted. Such riveting was not satisfactory, in a practical manner, as the hard spring steel member cut into the softer cold rolled steel member thus changing the relative displacement of the two members. As such relative displacement is critical to proper functioning of the aforementioned flasher, a riveted joint was thus unsatisfactory.

Another procedure tried in production was that of spot welding the two members together followed by a tempering operation. However, this procedure was not only costly but also difficult to control, thus making it unsatisfactory in production.

As a solution to the foregoing difficulties, it has been found, in accordance with the present invention, that a satisfactory welded joint between a high carbon spring steel member and a cold rolled steel member can be made by first spot welding the two members, then placing a piece of nickel, platinum, or an alloy thereof in the weld zone against the spring steel member, and spot welding the overlying piece to the members by a second spot weld. This second weld is made immediately adjacent the first weld so that, in effect, a generally elongated weld area is produced.

When the second weld is made, the area immediately adjacent the weld changes its metallurgical character and properties from those of a high carbon steel to those of an alloy of the steel with the nickel or platinum. This alloying of the overlying material with the iron of the high carbon steel decreases the carbon content. The metallurgically changed area has the characteristics of an alloy of nickel and iron, for example, heat treated at high temperatures, and the area appears to be hardened during the second welding operation. This second weld between the overlay piece and the members, displaced slightly from the first weld therebetween, assists in resisting relative turning of the two members about the first weld.

For an understanding of the invention principles, reference is made to the following description of a typical embodiment thereof as illustrated in the accompanying drawing.

Figure 2:
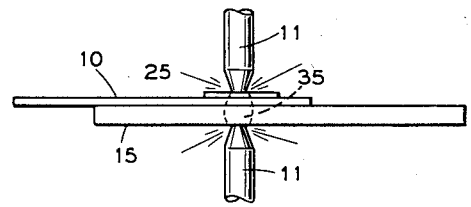
Figure 3:
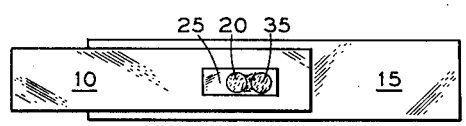

In the drawing:

Figs. 1 and 2 are elevation views illustrating successive steps in the invention method; and Fig. 3 is a plan view of the resultant welded joint.

Referring to the drawings, in accordance with the invention method a high carbon spring steel member 10 is superposed on a cold rolled steel member 15 and spot welded thereto, as by electrodes 11, 11 to form a spot weld 20 uniting members 10 and 15. This step is shown in Fig. 1.

Next, and as shown in Fig. 2, a piece 25 of nickel, platinum, or alloys thereof, is placed against member 10, the assembly is shifted slightly relative to electrodes 11, 11 or vice-versa and a second spot weld 35 is formed immediately adjacent weld 20. Weld 35 is spaced only a few thousandths of an inch from weld 20, resulting in the welded area having a generally elongated appearance, as shown in Fig. 3, rather than having a circular appearance.

When the first weld 20 is made, the high carbon steel of member 10 at and adjacent the weld becomes glass-hard and brittle due to the high welding temperature and fast cooling. When the second weld 35 is made, the properties of steel, particularly the high carbon steel of the weld area change to those of a nickel-iron alloy such as Z-nickel (when piece 25 is nickel). This alloy is not hardened to a brittle condition by the high welding temperature and rapid cooling. The weld 35, in addition, resists turning of members 10, 15 about welds 20—35.

The described method results in the production of a practically successful welded joint between a high carbon spring steel member and a cold rolled steel member.

While specific embodiments of the invention have been shown and described in detail to illustrate the application of the invention principles, it will be understood that the invention may be embodied otherwise without departing from such principles.

What is claimed is:

1. A method of weld uniting a high carbon spring steel member to a mild steel member comprising the steps of superposing said members; forming a first spot weld therebetween resulting in high air hardening in the weld heat affected area of the high carbon steel member; placing against the spring steel member a piece of metal selected from the class consisting of nickel, platinum, and alloys thereof; and spot welding said piece to said members by a second spot weld immediately adjacent and in the heat affected area of said first spot weld to change the metallurgical characteritsics of the weld heat affected area to those of a non-air hardening alloy of the spring steel member and such metal piece.

2. A method as claimed in claim 1 in which said piece comprises nickel.

3. A method as claimed in claim 1 in which said piece comprises platinum.

4. A welded joint comprising, in combination, a high carbon spring steel member interposed on a mild steel member; a first spot weld uniting said members; a piece of metal selected from the class consisting of nickel, platinum, and alloys thereof superposed on said spring steel member; and a second spot weld uniting said piece to said members and immediately adjacent and in the heat affected area of said first spot weld, and forming, in such heat affected area, a non-air hardening alloy of the spring steel member and such metal piece.

5. A welded joint as claimed in claim 4 in which said piece comprises nickel.

6. A welded joint as claimed in claim 4 in which said piece comprises platinum.

References Cited in the file of this patent

UNITED STATES PATENTS

| | | |
|---|---|---|
| 1,056,061 | Rogers | Mar. 18, 1913 |
| 2,250,617 | Argentin | July 29, 1941 |
| 2,356,049 | Goodwin | Aug. 15, 1944 |